Feb. 25, 1941.                H. T. CORY                 2,233,253
                          STRIPPING HARVESTER
                          Filed Nov. 21, 1939          3 Sheets-Sheet 1

Inventor
Harry Thomas Cory
By
Attorneys

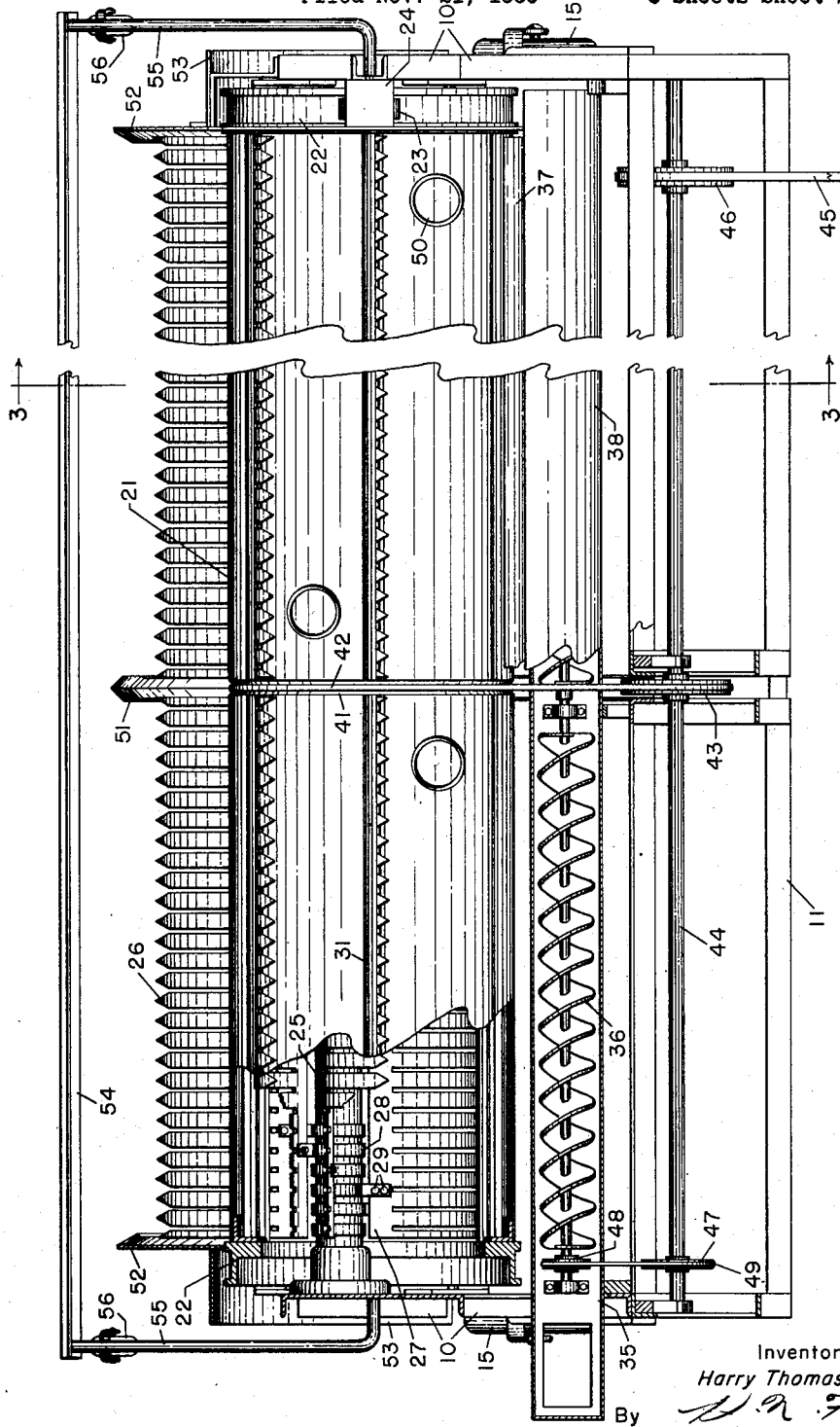

Patented Feb. 25, 1941

2,233,253

UNITED STATES PATENT OFFICE 2,233,253

STRIPPING HARVESTER

Harry Thomas Cory, Washington, D. C.

Application November 21, 1939, Serial No. 305,520

6 Claims. (Cl. 56—19)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to a machine for stripping grains from cereal stalks, and is more particularly concerned with new and useful improvements of the stripping harvester described and claimed in the patent issued to me on April 4, 1939, No. 2,152,730.

One of the objects of the present invention is to improve the structural combinations of the device described in the above-mentioned patent for more efficient and practical operation. The embodiment described in said patent, while broadly covering the essential features of my invention, is subject to excessive wear of certain parts and is not easily repaired.

With the above in mind, I have now provided an improved machine which is ordinarily adaptable to mass production, which is more positively operating, easier to repair, and more efficient in operation. The essential features of these improvements comprise a simpler method of mounting the teeth and an improved method of cleaning the teeth. With the new arrangement of parts, it will be seen that the machine may be constructed in units, from which any desired capacity of machine may be fabricated. Also the new construction enables the machine to be shipped in a knock-down form and various parts thereof may be nested together so as to occupy a minimum of space in shipping.

The following description, considered together with the accompanying drawing, will disclose this invention more fully, its construction, arrangements, and operations of parts, and further objects and advantages thereof will be apparent.

In the drawings:

Figure 2 is a top plan view of the embodiment detached from the tractor with a partial section along the line 2—2 of Figure 1.

Figure 1:
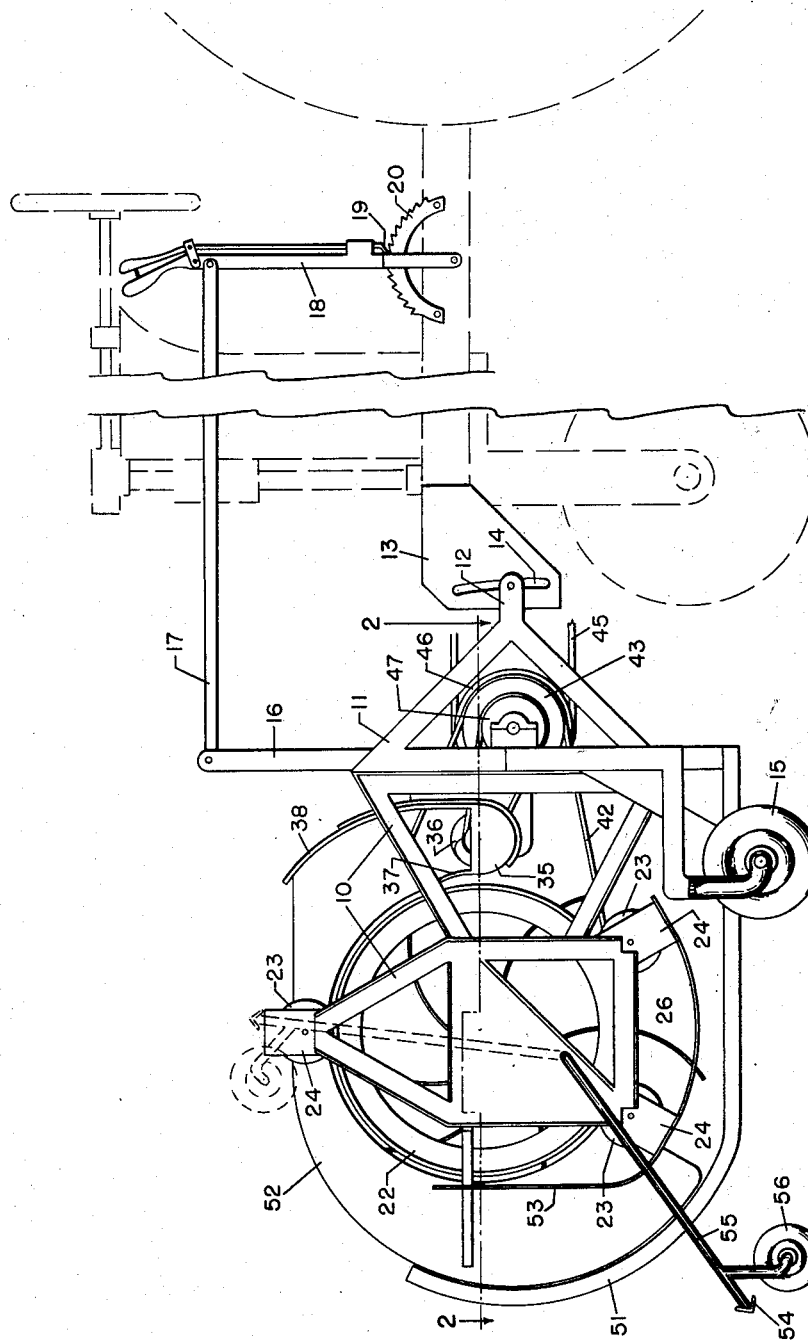
Figure 1 is a side elevational view of an embodiment of this invention as it appears attached to the front of an ordinary farm tractor, the tractor being shown fragmentarily.

Referring with more particularity to the drawings in which like numerals designate like parts, the device is mounted between two end frames 10, 10. These two end frames are connected by a lateral girder 11, sufficiently stiffened. This girder is connected to a bracket 13 on the front of the tractor by means of horizontal bars 12, operating in vertical slots 14 in said brackets. While ordinarily only two of such connections are necessary, any additional number may be employed depending upon the size of the machine. The device is preferably supported on the ground by means of castors 15, suitably connected to the framework. It is preferable for the castors to be disposed just rearward of the center of gravity. Stanchions 16 are secured to the frame of the machine and are connected by links 17 to an operating lever 18 on the tractor, which lever is provided with a dog 19 adapted to register with a notched segment 20. By these means the elevation of the device may be adjusted. Also, since the center of gravity is forward of the castors 15, the link 17 is always in tension.

Between the end frames 10, 10, the cylinder assembly 21 is disposed. This cylinder assembly is made up of sections which will be hereinafter more fully described. The cylinder assembly is connected at each end to a double flanged ring 22 and is thus supported on trunnion rollers 23. The trunnion rollers are mounted between U-brackets 24, one side of which is fixed to the respective end frame. The rollers 23 are adapted to fit between the flanges of the rings 22 and the construction is such that the rollers absorb any axial thrust delivered to it by the flanges. In this manner the cylinder assembly 21 is freely rotatable and is supported solely on the end frames by said rollers 23. These rollers also reduce the friction in operation.

Figure 3:
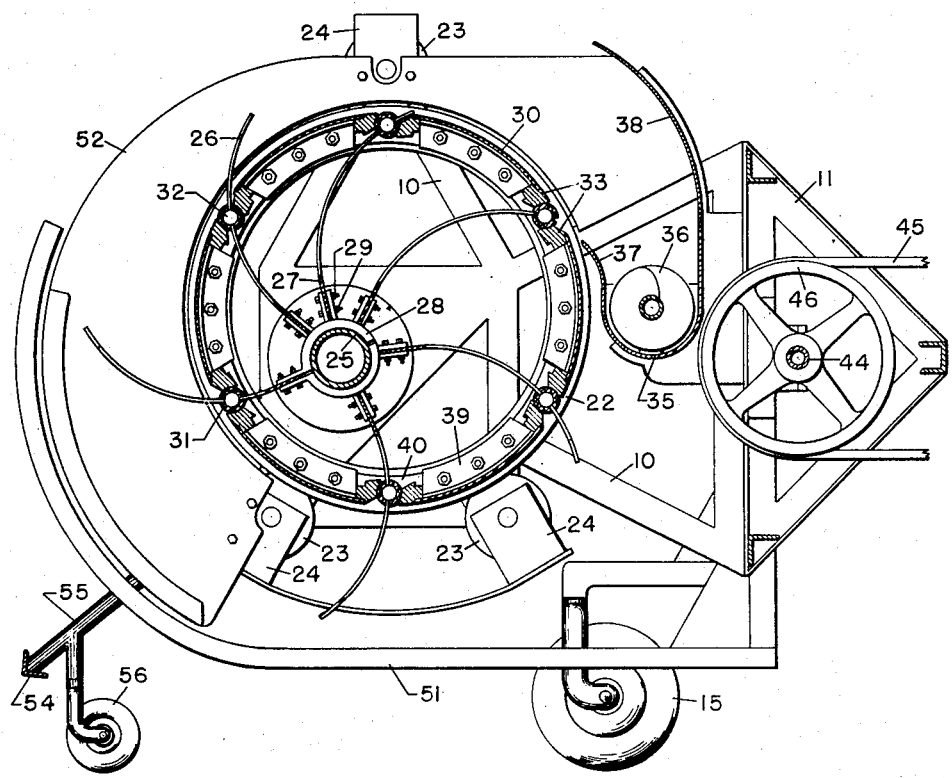
Figure 3 is a section along the line 3—3 of Figure 2.

Within the cylinder assembly 21, there is mounted an eccentric shaft 25, which is secured to the end frames 10, 10. The direction of eccentricity should be such as to afford an optimum operation of the machine through the crops to be harvested. In Figure 3, the eccentricity is shown at an angle of about 45° downward and toward the front. To said shaft 25 the stripping teeth 26 in the form of combs 27 are hinged. The combs are mounted as units by means of bands 28, there being at least two bands for each comb. These bands 28 should be stiff and, for this reason, it is preferable to make them in two parts, as illustrated, depending upon the connection to the combs to hold them securely about the shaft 25.

This connection should be demountable and may be accomplished by means of bolts and nuts 29, so that repairs or substitutions may be easily made. The teeth 26 of the combs curve forwardly and operate through apertures in the cylinder assembly.

Figure 4:
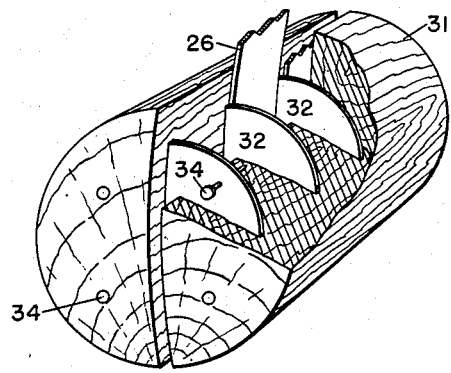
Figure 4 is a perspective view partly cut away of one of the comb-cleaning elements removed from the machine.

The cylinder assembly is constructed in units, each unit comprising a plurality of curved cylindrical sectors or segments 30, preferably six. Between segments there are disposed the teeth cleaning units, which units comprise a split cylindrical element 31 (see Figure 4), which is held together in spaced relation by means of a plurality of sunken discs 32. Each cylinder assembly extends the length of its respective section and is rotatably mounted between suitable full length bearing blocks 33, 33. Through the ends of each of said cylinders 31, there is disposed a plurality of pins 34, which extend just through and beyond the end discs. In this manner the entire assembly is made rigid. The thickness of each disc is substantially the same or slightly less than the distance between the teeth of the combs, the space between each consecutive pair of discs being reserved for one tooth. By these means, the teeth sliding through the spaces between discs are cleaned. The split cylinders 31 are preferably made of hard wood. I have found that the best type of material for this construction is certain treated wood, termed Vermont Rock Maple treated with an oil that provides self-lubrication at predetermined temperatures.

As indicated in my prior patent above mentioned, the eccentricity of the shaft 25 should be such that at some point in the operation the teeth of the combs will be drawn fully into the cylinder. By means of the construction shown in the present drawing, it is possible to draw the teeth in even further than was possible in the construction shown in my prior patent in view of the additional distance permitted by reason of the diameter of the cylinders 31, so that there is not simply a point, but an appreciable angle in the rotation of the cylinder through which the teeth of the comb do not project from the cylinder. Within this distance the collecting means may be disposed, which means comprises a trough 35 within which a conveyor screw 36 is rotatably mounted. The forward side of the trough 37 extends upward to act as a guide for the grain, and the rearward side of the trough 38 extends upward a considerable distance and acts as a shield to prevent the loss of grain coming around over the cylinder which may be thrown in various directions.

Each cylinder section is held together by end rings 40, bolted, or otherwise secured, to flanges 39 of the cylindrical segments 30. Between sections, it is only necessary to provide a simple flat ring, and at the ends of the assembled cylinder the rings 22 may be used for this purpose. By these means any two adjacent sections may be held together by bolting the flanges of their respective cylindrical elements to a common ring.

At intervals throughout the length of the cylinder assembly, means for rotating the cylinder are provided. These means simply consist of utilizing a thicker connecting ring for the sections, having a V-groove such as ring 41, illustrated in Figure 2. This ring is driven by means of a belt 42, which belt in turn is connected to a driving pulley 43, fixed to a powered shaft 44. This powered shaft receives its power from any suitable source, such as a take-off of the tractor to which the device is attached. In Figure 2, this is illustrated by means of a belt connection 45 to a pulley 46, fixed to the shaft 44. The belt driving means may be substituted for any other suitable means, such as sprocket and chain, and pinion and gear.

The screw conveyor 36 is also driven from the powered shaft 44 by means of pulleys 47 and 48 and a belt connection 49. (Any other suitable grain conveying device may be utilized instead of the conveyor screw, such as an endless belt conveyor.)

In order to provide easily accessible means for making adjustments to the parts within the cylinder, apertures are provided at desired points through the cylinder sections 30 with removable cover plates 50. It is preferable to have these openings near the ends of each section.

Between each cylinder section a diverter 51 is disposed. This diverter may be attached to any suitable point on the frame and is at a distance in front of the cylinder sufficiently to clear the stripping teeth. The object of this diverter is to force the grain to either side. This is necessary because any grain contacting the space between consecutive sections would not be stripped, and by keeping the grain out of this area the efficiency of the machine is increased. It is also desirable to employ diverters at the ends of the cylinder assembly and this may be accomplished by means of end plates 52 fixed to the frame of the machine, substantially as shown. It is preferable to have these plates large enough to cover that portion of the circumference of the cylinder through which the grain is stripped and carried, so that there will be no loss of grain at the ends. Such losses may ordinarily occur from the movement of the grain or from the wind blowing across the cylinder. It is also desirable to provide casings 53 extending from the plates 52 about the forward part of the end rings 22 to prevent grain in stalks from contacting this part of the device and clogging the machinery.

An additional improvement is the provision of means to right any fallen or lodged stalks into the path of the stripping teeth. Otherwise, such lodged grain may escape the action of the machine entirely. These means consist of a bar 54 disposed parallel and in front of the cylinder assembly 21, supported by a pair of arms 55 hinged to the frame of the machine, substantially as shown. These arms 55 are supported on the ground by means of castors 56. Ordinarily, it will not be necessary to use these means because lodged grain is not a usual situation. In such cases, the bar 54 may be swung out of operating position into the position indicated by dotted lines in Figure 1.

In order to use the bar 54 effectively, it is necessary to direct the machine through the field of grain in a direction opposite to that in which the grain has fallen or become lodged. Ordinarily, the standing grain will fall or become lodged in one general direction, due to the action of wind, rain, or other similar factors obtaining at the particular locality. As the bar 54 moves through the field in advance of the stripping teeth it contacts the grain stalks underneath, and as it slides under the inclined grain stalks, moving toward the root ends of the stalks, it elevates them sufficiently to bring the heads of grain in the path of the stripping teeth.

Having thus described my invention, I claim:
1. In a stripping harvester of the type described having grain stripping teeth, a cylinder comprising a plurality of cylindrical units removably secured together, each unit comprising a plurality of cylindrical sectors, said sectors being inwardly flanged at both ends, a plate disposed between adjacent units and secured to the flanges of the adjacent sectors of each unit, whereby the sectors are held together in cylindrical units and the cylindrical units are held together as the fabricated cylinder, said units having a plurality of elements between adjacent sectors, bearing surfaces for rotatably supporting said elements, said elements having apertures to accommodate grain stripping teeth.

2. In a stripping harvester of the type described, a cylinder comprising a plurality of cylindrical units removably secured together, each unit comprising a plurality of cylindrical sectors, said sectors being inwardly flanged at both ends, a plate disposed between adjacent units and secured to the flanges of the adjacent sectors of each unit, whereby the sectors are held together in cylindrical units and the cylindrical units are held together as the fabricated cylinder, a pair of semi-cylindrical members disposed between adjacent sectors in spaced relation, a plurality of transverse plates between said members, means for rigidly holding said members and plates together as a unit, and bearing surfaces between each unit and its corresponding sectors, whereby the unit is free to rotate.

3. A device for stripping grain, said device comprising a hollow cylinder rotatably mounted, said cylinder being fabricated of a plurality of cylindrical units, each unit comprising a plurality of cylindrical sectors, a plate disposed between adjacent units and secured to the sectors thereof, whereby the sectors are held together in cylindrical units and the cylindrical units are held together as a fabricated cylinder, means for rotating the assembled cylinder, a flanged cylindrical bearing surface eccentrically fixed to each end of the assembled cylinder, trunnion rollers engaging said surfaces between the flanges thereof, said rollers being secured to the frame of the machine, a shaft eccentrically mounted with respect to the axis of said cylinder, and a plurality of teeth hinged to said shaft, said teeth projecting through rows of apertures in each section of said cylinder.

4. A device for stripping grain, said device comprising a hollow cylinder rotatably mounted, means for rotatably actuating said cylinder, a shaft eccentrically mounted with respect to the axis of said cylinder, said cylinder having a plurality of rows of apertures therethrough, combs of grain stripping teeth disposed through said apertures, each comb being independently hinged to said shaft, and means for hinging said combs to said shaft, said means comprising split bands, there being at least two bands for each comb, each band being rotatably mounted on said shaft and secured to its corresponding comb.

5. In a device for stripping grain, having a hollow cylinder rotatably mounted, means for rotatably actuating said cylinder, a shaft eccentrically mounted with respect to the axis of said cylinder, said cylinder having a plurality of rows of apertures therethrough, and combs of grain stripping teeth disposed through said apertures, each comb being independently hinged to said shaft, means for hinging said combs to said shaft, said means comprising a plurality of rigid substantially semi-circular bands for each comb, each band being engaged with said shaft and secured to the comb.

6. In a stripping harvester of the type mentioned having grain stripping teeth, a cylinder comprising a plurality of cylindrical units removably secured together, each unit comprising a plurality of cylindrical sectors, said sectors being inwardly flanged at both ends, a plate disposed between adjacent units and secured to the flanges of the adjacent sectors of each unit, whereby the sectors are held together in cylindrical units and the cylindrical units are held together as the fabricated cylinder, a pair of semi-cylindrical members disposed between adjacent sectors in spaced relation, said teeth being normally disposed between said members and slidable with respect thereto, means for holding a pair of said members together as a unit, bearing surfaces between each unit pair and its adjacent sectors, each unit being rotatable with respect to said bearing surface, said means being disposed in the spaces between said teeth to scavenge said spaces when said teeth are slidably actuated between said members.

HARRY THOMAS CORY.